US012547136B2

(12) United States Patent
Dölle et al.

(10) Patent No.: US 12,547,136 B2
(45) Date of Patent: Feb. 10, 2026

(54) CONTROL PLATFORM FOR EXCHANGES OF ENERGY BETWEEN A PLURALITY OF ENERGY SYSTEMS AND ENERGY EXCHANGE SYSTEM

(71) Applicant: Siemens Aktiengesellschaft, Munich (DE)

(72) Inventors: Oliver Dölle, Erlangen (DE); Stefan Niessen, Erlangen (DE); Sebastian Schreck, Nuremberg (DE); Sebastian Thiem, Neustadt an der Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 791 days.

(21) Appl. No.: 17/909,041

(22) PCT Filed: Nov. 6, 2020

(86) PCT No.: PCT/EP2020/081334
§ 371 (c)(1),
(2) Date: Sep. 2, 2022

(87) PCT Pub. No.: WO2021/175463
PCT Pub. Date: Sep. 10, 2021

(65) Prior Publication Data
US 2023/0093272 A1  Mar. 23, 2023

(30) Foreign Application Priority Data
Mar. 5, 2020 (EP) .................................. 20161156

(51) Int. Cl.
*G05B 17/02* (2006.01)
(52) U.S. Cl.
CPC ...... *G05B 17/02* (2013.01); *G05B 2219/2639* (2013.01)

(58) Field of Classification Search
CPC . G05B 17/02; G05B 2219/2639; Y02E 40/70; Y04S 10/50; Y04S 20/222;
(Continued)

(56) References Cited

U.S. PATENT DOCUMENTS

| 2002/0194113 A1* | 12/2002 | Lof | ......................... G01W 1/10 |
| | | | 705/37 |
| 2012/0143385 A1 | 6/2012 | Goldsmith | ................ G06F 1/26 |

(Continued)

FOREIGN PATENT DOCUMENTS

| CN | 110 648 006 | 1/2020 | ............. G06Q 10/04 |
| DE | 10 2013 214 996 | 7/2014 | ............. G06Q 50/06 |

(Continued)

OTHER PUBLICATIONS

Search Report for International Application No. PCT/EP2020/081334, 13 pages, Mar. 1, 2021.
(Continued)

*Primary Examiner* — Chad G Erdman
(74) *Attorney, Agent, or Firm* — Slayden Grubert Beard PLLC

(57) ABSTRACT

Various embodiments include a method for operating a control platform for energy exchanges between a plurality of energy systems. The method may include: receiving information related to an intended energy exchange from the energy systems; calculating optimum energy exchanges between the energy systems; receiving a plurality of possible energy exchanges s from at least one of the energy systems; for each of the received possible energy exchanges s, performing an optimization method, and therefore calculating an associated partial solution $Z(\zeta_s)$; calculating the total solution from the plurality of partial solutions $Z(\zeta_s)$ depending on their probability values $\zeta_s$; and controlling energy exchanges between the plurality of energy systems by the (Continued)

control platform on the basis of the determined total solution.

10 Claims, 2 Drawing Sheets

(58) Field of Classification Search
CPC .. H02J 3/48; H02J 3/004; H02J 3/008; G06Q 50/06
See application file for complete search history.

(56) References Cited

U.S. PATENT DOCUMENTS

| | | | |
|---|---|---|---|
| 2018/0143603 A1 | 5/2018 | Tsai | G05B 19/042 |
| 2021/0036521 A1 | 2/2021 | Chapotard | H02J 3/46 |

FOREIGN PATENT DOCUMENTS

| | | | |
|---|---|---|---|
| EP | 1 263 108 | 12/2002 | H02J 3/00 |
| EP | 3 518 369 | 7/2019 | H02J 3/46 |
| JP | 2019140862 A * | 8/2019 | |
| WO | 2007 065135 | 6/2007 | G05D 11/00 |
| WO | 2015 048737 | 4/2015 | H02J 3/00 |
| WO | 2020 014006 | 1/2020 | H02J 3/38 |
| WO | WO-2020014006 A1 * | 1/2020 | H02J 3/004 |

OTHER PUBLICATIONS

Search Report for EP Application No. 20161156.3, 9 pages, Sep. 20, 2015.

* cited by examiner

CONTROL PLATFORM FOR EXCHANGES OF ENERGY BETWEEN A PLURALITY OF ENERGY SYSTEMS AND ENERGY EXCHANGE SYSTEM

CROSS-REFERENCE TO RELATED APPLICATIONS

This application is a U.S. National Stage Application of International Application No. PCT/EP2021/081334 filed Nov. 6, 2020, which designates the United States of America, and claims priority to EP Application No. 20161156.3 filed Mar. 5, 2020, the contents of which are hereby incorporated by reference in their entirety.

TECHNICAL FIELD

The present disclosure relates to energy exchange systems. Various embodiments of the teachings herein may include methods and/or systems for operating a control platform for energy systems and/or energy exchange systems.

BACKGROUND

Energy systems can exchange and trade locally recovered energy, in particular electrical energy (electricity), with one another by means of a local energy market. In this case, owing to its decentralized technical configuration, the local energy market makes it possible to match the locally recovered energy efficiently to the local energy consumption. Thus, a local energy market may be advantageous, particularly with respect to renewable energies, which are typically recovered locally. In principle, in this case the energy systems can be categorized as energy consumers (consumers), energy converters and prosumers, which can both consume and provide or recover energy. In this case, energy converters can be referred to colloquially as energy generators (generators), wherein the term generation relates to the provided energy form, for example electricity in the case of electricity generators.

Technically, a local energy market is realized by a control platform, which can likewise be referred to as energy market platform. In this case, the control platform coordinates or controls the energy exchanges between the energy systems on the basis of offers which the energy systems communicate in advance to the control platform. Such a control platform or local energy market is described, for example, in EP 3518369 A1.

For relatively small energy systems, for example residential buildings, a plurality of challenges result in respect of their inclusion in a local energy market. In particular, prior to an actual energy exchange, the amount of energy that an energy system is expected to consume and/or provide within a fixed time range must be known to the control platform. In other words, a prediction of the energy exchange to be expected for the respective energy system is required. In this case, the communication of the intended energy exchange to the control platform typically takes places as part of offers.

Relatively small energy systems typically have relatively significant inaccuracies in respect of their predictions. For relatively large energy systems, for example for housing developments, a standard load profile and/or standard generation profile can be used which typically represents a sufficiently good approximation. For relatively small energy systems, these standard profiles are a markedly worse approximation owing to stochastic processes, for example a vacuum cleaner being switched on. In other words, stochastic processes dominate the demand profile or load profile of relatively small energy systems.

Owing to a prediction which is subject to uncertainties, the efficiency of the local energy market is impaired since recovery/provision and consumption of energy have a relatively large discrepancy with respect to one another. It is therefore necessary to compensate for the difference by means of positive or negative reserve energy which is provided, for example, by an electrical grid which is external in respect of the local energy market. In other words, the efficiency of the local energy market decreases as the uncertainty in the prediction increases since either always reserve energy needs to be provided and/or locally recovered energy is not consumed and therefore needs to be buffer-stored and/or fed into the superordinate electrical grid.

SUMMARY

The present disclosure describes methods for operating a control platform and a control platform which improves the efficiency of the associated local energy market in respect of uncertainties in the energy exchanges. For example, some embodiments include a method for operating a control platform for energy exchanges between a plurality of energy systems, wherein in each case at least one item of information on an intended energy exchange is received by the control platform from the energy systems for at least one time range, and in which the control platform calculates, in respect of a target function, optimum energy exchanges between the energy systems as a solution of an optimization method, characterized in that the control platform receives an item of information on a plurality of possible energy exchanges s from at least one of the energy systems, wherein a probability value $\zeta_s$ which is likewise received by the control platform is assigned to each of these energy exchanges s; for each of the received possible energy exchanges s, an optimization method is performed, and therefore an associated partial solution $Z(\zeta_s)$ is calculated; the total solution (142) is calculated from the plurality of partial solutions $Z(\zeta_s)$ depending on their probability values $\zeta_s$; and the energy exchanges between the energy systems are controlled by the control platform on the basis of the determined total solution (142).

In some embodiments, the control of the energy exchanges s by means of the control platform takes place by a communication of respective control data to the respective energy system.

In some embodiments, for an intended energy consumption of one of the energy systems, an item of information on a maximum amount of energy to be consumed is received by the control platform from the energy system.

In some embodiments, for an intended provision of energy of one of the energy systems, an item of information on a maximum amount of energy to be provided is received by the control platform from the energy system.

In some embodiments, the total solution (142) is calculated from the plurality of partial solutions $Z(\zeta_s)$ by the maximum in respect of the probability values $\zeta_s$ of adjacent gradients of the partial solutions $Z(\zeta_s)$ of the possible energy exchanges s.

In some embodiments, the total solution (142) is calculated by $$\max_s \left[ \frac{Z(\zeta_{s-1}) - Z(\zeta_s)}{\zeta_{s-1} - \zeta_s} - \frac{Z(\zeta_s) - Z(\zeta_{s+1})}{\zeta_s - \zeta_{s+1}} \right]$$

In some embodiments, the total solution (142) is calculated by virtue of the fact that the difference in terms of absolute value between adjacent partial solutions $|Z(\zeta_s)-Z(\zeta_{s-1})/(\zeta_{s-1}-\zeta_s)|$ exceeds a fixed threshold value.

In some embodiments, the control platform determines reserve capacities required for the energy exchanges on the basis of the total solution (142).

As another example, some embodiments include a control platform for controlling energy exchanges between a plurality of energy systems, wherein in each case at least one item of information on an intended energy exchange can be received by the control platform from the energy systems for at least one time range, and, in respect of a target function, optimum energy exchanges between the energy systems can be calculated by the control platform as a solution of an optimization method, characterized in that an item of information on a plurality of possible energy exchanges s can be received by the control platform from at least one of the energy systems, wherein a probability value $\zeta_s$ which can likewise be received by the control platform is assigned to each of these energy exchanges s; for each of the received possible energy exchanges s, an optimization method can be performed by the control platform, and therefore an associated partial solution $Z(\zeta_s)$ can be calculated; the total solution (142) can be calculated from the plurality of partial solutions $Z(\zeta_s)$ by the control platform depending on their probability values $\zeta_s$; and the energy exchanges between the energy systems are controllable by the control platform on the basis of the determined total solution (142).

As another example, some embodiments include a method for operating an energy exchange system, which comprises a plurality of energy systems and a control platform, wherein the energy systems communicate in each case one item of information on at least one intended energy exchange to the control platform for at least one time range, and in which the control platform calculates, in respect of a target function, optimum energy exchanges between the energy systems as a solution of an optimization method, characterized in that at least one of the energy systems communicates an item of information on a plurality of possible energy exchanges s to the control platform, wherein a probability value $\zeta_s$ which is likewise communicated to the control platform is assigned to each of these energy exchanges s; for each of the communicated possible energy exchanges s, an optimization method is performed, and therefore an associated partial solution $Z(\zeta_s)$ is determined; the total solution (142) is calculated from the plurality of partial solutions $Z(\zeta_s)$ depending on their probability values $\zeta_s$; and the energy exchanges between the energy systems are controlled by the control platform on the basis of the determined total solution (142).

As another example, some embodiments include an energy exchange system, comprising a plurality of energy systems and a control platform, wherein the energy systems and the control platform are designed in such a way that in each case one item of information on at least one intended energy exchange can be communicated to the control platform by the energy systems for at least one time range, and, in respect of a target function, optimum energy exchanges between the energy systems can be calculated by means of the control platform as a solution of an optimization method, characterized in that an item of information on a plurality of possible energy exchanges s can be communicated to the control platform at least by one of the energy systems, wherein a probability value $\zeta_s$ which can likewise be communicated to the control platform is assigned to each of these energy exchanges s; for each of the communicated possible energy exchanges s, an optimization method can be performed by the control platform, and therefore an associated partial solution $Z(\zeta_s)$ can be calculated; the total solution (142) can be calculated from the plurality of partial solutions $Z(\zeta_s)$ by the control platform depending on their probability values $\zeta_s$; and the energy exchanges between the energy systems are controllable by the control platform on the basis of the determined total solution (142).

BRIEF DESCRIPTION OF THE DRAWINGS

Further advantages, features, and details of the teachings herein can be gleaned from the exemplary embodiments described below and from the drawings, in which, in schematized form.

DETAILED DESCRIPTION

Figure 1:
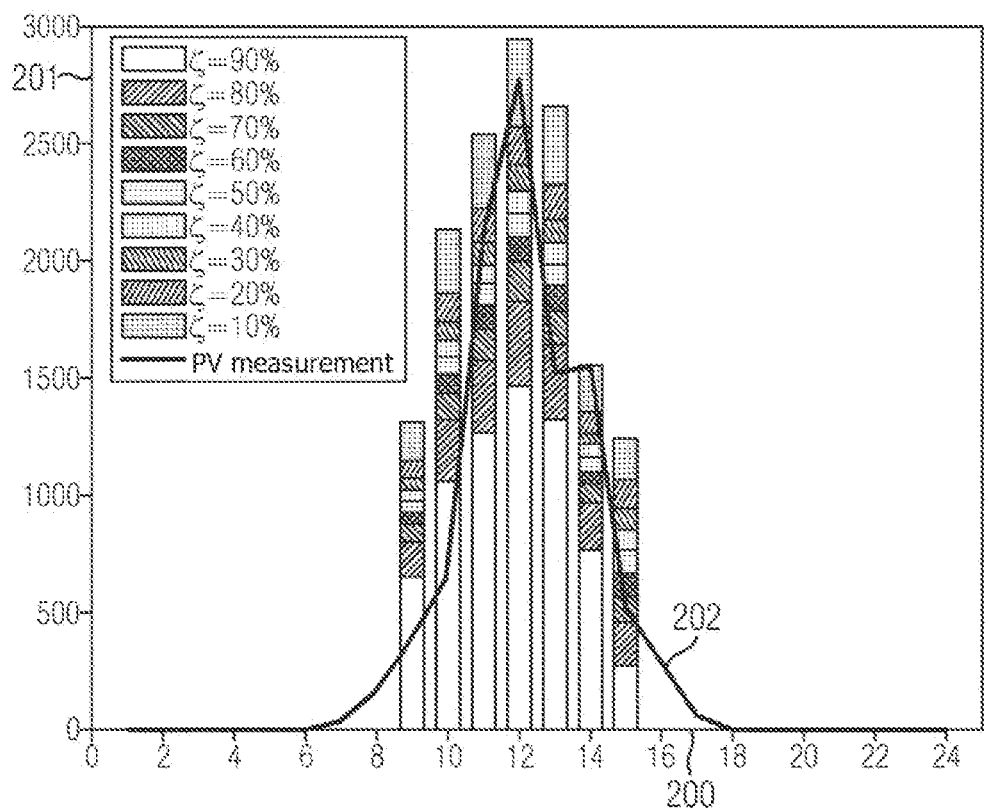
FIG. 1 shows a probabilistic prediction for a photovoltaic installation.

In some embodiments of the teachings herein, a method for operating a control platform for energy exchanges between a plurality of energy systems, in each case at least one item of information on an intended energy exchange is received by the control platform from the energy systems for at least one time range, and, in respect of a target function, optimum energy exchanges between the energy systems are calculated by the control platform as a solution of an optimization method. In some embodiments, the control platform receives an item of information on a plurality of possible energy exchanges s from at least one of the energy systems, wherein a probability value $\zeta_s$ which is likewise received by the control platform is assigned to each of these energy exchanges s; for each of the received possible energy exchanges s, an optimization method is performed, and therefore an associated partial solution $Z(\zeta_s)$ is calculated; the total solution is calculated from the plurality of partial solutions $Z(\zeta_s)$ depending on their probability values $\zeta_s$; and the energy exchanges between the energy systems are controlled by the control platform on the basis of the determined total solution.

The methods for operating a control platform and/or one of its configurations or one or more functions, features and/or steps of the method or its configurations can be computer-supported. Here, the term control includes closed-loop control. Energy can be provided by energy recovery, for example by means of an energy converter, and/or by an energy store. The term energy consumption includes any type of consumption of provided energy, in particular likewise energy storage.

A possible energy exchange is a probable amount of energy within the time range which has a specific probability, i.e., which is assigned a probability value. In other words, a possible energy exchange is characterized by a probability density function. In this case, the probability value or the probability density function specifies how probable an energy exchange with a specific associated amount of energy is. The probability value or the probability density function can be determined by means of statistical methods/procedures and/or by means of historical data of historical or past energy exchanges.

An optimization method or an optimization within the meaning of the present disclosure is a method for minimizing or maximizing a target function. The minimization or maximization of the target function typically takes place numerically owing to its complexity. The target function in this case characterizes one or more properties or variables of the system, for example the carbon dioxide emissions, the total amount (volume) of energy exchanged and/or the operating costs of one or more energy systems. The target function has parameters, in particular technical parameters of the energy systems, and variables.

The result of the optimization are the values of the variables which correspond to the amounts of energy or powers to be exchanged. Thus, the solution of the optimization method characterizes at least which amounts of energy are consumed and/or provided by which energy system within the time range. In other words, the energy exchanges between the energy systems are the solution of the optimization method. In an equivalent manner to energy exchanges, power exchanges or powers are used since these, integrated over a time range, represent the corresponding amount of energy. In other words, in this case the terms energy and power are equivalent and are interchangeable since an associated energy or amount of energy always corresponds to a power in a time range.

In some embodiments, the control platform receives the item of information on the intended energy exchange from a plurality of energy systems for the time range, for example for a coming day, for a coming hour or for the coming 15 minutes. In other words, the energy systems (not necessarily each of the energy systems) communicate to the control platform the amount of energy which it intends to consume, in particular store, and/or provide, in particular recover, within the time range. For example, this takes place by means of a respective tuple, which characterizes the maximum amount of energy which can be consumed, in particular stored, and/or provided, in particular recovered, by the respective energy system and includes an associated fee. For a provision, a minimum fee, for example in the unit of euros per kilowatt hour, and for a consumption, a maximum fee, for example in the unit of euros per kilowatt hour, are communicated. In other words, each energy system, if it is participating in the energy exchange within the time range, communicates an offer for a maximum amount of energy for a minimum price in the case of provision or for a maximum price in the case of consumption. Thus, the offer includes the item of technical information of the respective maximum amount of energy to be exchanged. If a continuous or quasi-continuous operation is desired, the mentioned items of information are communicated by the energy systems to the control platform for each time range/time increment and received by said control platform.

The control platform receives an item of information on a plurality of possible energy exchanges s, where $s=1, \ldots, N$, from at least one of the energy systems, wherein a probability value $\zeta_s$ is assigned to each of these energy exchanges s. The probability value $\zeta_s$ associated with the energy exchange is likewise communicated to and received by the control platform. In other words, a probability distribution (discretely or continuously as a density function) with respect to the possible energy exchanges is communicated to and received by the control platform. For example, the item of information is characterized by probability-amount of energy tuples $([\zeta_1, P_{t,n,k} \leq P_1^{max}], \ldots, [\zeta_N, P_{t,n,k} \leq P_N^{max}])$. In this case, $P_{t,n,k}$ denotes the power of the energy system k at the network node n at the time t or within the associated time range. Thus, the respective data field $[\zeta_s, P_{t,n,k} \leq P_s^{max}]$ denotes the probability $\zeta_s$ of the power exchanged within the time range being less than or equal to $P_s^{max}$ or the amount of energy exchanged within the time range T being less than or equal to $P_s^{max} \cdot T$.

In some embodiments, for each of the received possible energy exchanges s, an optimization method is performed, and therefore an associated partial solution $Z(\zeta_s)$ is calculated. The calculation of the plurality of partial solutions can take place in parallel or in series. The partial solutions are assigned to the respective probability value $\zeta_s$, with the result that the partial solutions are dependent thereon. Each partial solution $Z(\zeta_s)$ characterizes the most optimum possible energy exchanges between the energy systems if the one of the energy systems were only to have communicated the possible energy exchange s as intended energy exchange.

If the partial solutions are known, a total solution is determined or calculated from the plurality of partial solutions. The calculation in this case takes place depending on the probability values $\zeta_s$. In particular, one of the partial solutions $Z^*=Z(\zeta_{s=s^*})$ is determined which is a compromise or a balance between a high-risk and a low-risk solution in respect of the probability of the possible energy exchanges s. For example, $Z^*$ is determined by a marked change in the function characteristic $Z(\zeta_s)$ or $Z(\zeta)$.

The actual energy exchanges between the energy systems are fixed by the total solution. The control platform according to the invention now controls, based on or corresponding to the determined total solution, the energy exchanges between the energy systems. In this case, the term control should be interpreted broadly. In particular, each measure of the control platform, which in principle has at least a direct or indirect partial effect on the actual energy exchanges, should be understood as control by the control platform. For example, the energy exchanges are controlled by a data signal, which includes control data and is communicated by the control platform to the respective energy systems. By means of the data signal, for example power engineering installations of the energy systems are switched on, connected, disconnected and/or changed in terms of their operation, wherein the actual direct operational control of the installations can in this case be passed on to the energy system and/or an energy management system of the energy system. The signal of the control platform in this case forms only the trigger for the mentioned operational processes, which then ultimately lead to the energy exchange, i.e., to the energy provision and/or to the energy consumption.

In some embodiments, the signal of the control platform is a price signal, i.e., a data signal which characterizes a cost-advantageous provision and/or a cost-advantageous consumption. For example, a provision is cost-advantageous when more energy is intended to be consumed locally than is provided locally. For example, a local unit-type cogeneration plant is switched on by the price signal. A local consumption is in particular cost-advantageous when more energy is provided locally than is consumed locally. For example, in the case of an increased photovoltaic electricity generation in the afternoon. Thus, the energy efficiency of the local energy market is likewise improved by the price signal since the local provision of energy and its local consumption can be brought into correspondence in an improved manner, and therefore less reserve energy needs to be provided and/or used.

In some embodiments, therefore, the uncertainties for an intended energy exchange, i.e., for an energy provision and/or an energy consumption, are taken into consideration in the optimization by the control platform. Therefore, a technically best-possible and objective total solution in terms of the uncertainties can be determined. As a result, the uncertainties or the associated probabilities are considered as a whole, with the result that they can be allegorically levered against one another. By means of this holistic consideration, the uncertainty within the entire local energy market is reduced. Thus, less reserve power needs to be provided for the balancing, with the result that energy provision and energy consumption can be brought into correspondence more efficiently. In other words, differences occurring in the energy balance between the energy systems are identified by the control platform a priori and can therefore be reduced. Furthermore, the optimization and therefore the solution can be configured to be robust such that, even in the worst case, sufficient reserve energy/reserve power is provided. In this case, reserve capacities can be estimated in an improved manner and used more efficiently.

Further, the development of renewable energies, in particular the local development of renewable energies, is promoted. In this case, the development of energy stores, in particular of electrochemical energy stores, for example of battery stores, can likewise be promoted. These provide flexibility and stabilize the local energy market, which typically for the most part comprises volatile energy sources. As a result, the superordinate electricity grid is relieved of load since local provision of energy and local consumption thereof can be matched in an improved manner.

The control platform for controlling energy exchanges between a plurality of energy systems, wherein in each case at least one item of information on an intended energy exchange can be received by the control platform from the energy systems for at least one time range, and, in respect of a target function, optimum energy exchanges between the energy systems can be calculated by the control platform as a solution of an optimization method, is characterized in that an item of information on a plurality of possible energy exchanges s can be received by the control platform from at least one of the energy systems, wherein a probability value $\zeta_s$ which can likewise be received by the control platform is assigned to each of these energy exchanges s; for each of the received possible energy exchanges s, an optimization method can be performed by the control platform, and therefore an associated partial solution $Z(\zeta_s)$ can be calculated; the total solution can be calculated from the plurality of partial solutions $Z(\zeta_s)$ by the control platform depending on their probability values $\zeta_s$; and the energy exchanges between the energy systems are controllable by the control platform on the basis of the determined total solution.

The control platform is configured to perform the mentioned features, such as, for example, the reception of the data and/or the calculation of the partial solutions and the total solution by means of the optimization method. Similar and/or equivalent advantages and/or configurations result from the methods for operating a control platform described herein.

In some embodiments, a method for operating an energy exchange system, which comprises a plurality of energy systems and a control platform, wherein the energy systems communicate in each case one item of information on at least one intended energy exchange to the control platform for at least one time range, and in which the control platform calculates, in respect of a target function, optimum energy exchanges between the energy systems as a solution of an optimization method, is characterized in that at least one of the energy systems communicates an item of information on a plurality of possible energy exchanges s to the control platform, wherein a probability value $\zeta_s$ which is likewise communicated to the control platform is assigned to each of these energy exchanges s; for each of the communicated possible energy exchanges s, an optimization method is performed, and therefore an associated partial solution $Z(\zeta_s)$ is determined; the total solution is calculated from the plurality of partial solutions $Z(\zeta_s)$ depending on their probability values $\zeta_s$; and the energy exchanges between the energy systems are controlled by the control platform on the basis of the determined total solution. These methods and/or one of its configurations or one or more functions, features and/or steps of the method and/or its configurations can be computer-supported.

In some embodiments, an energy exchange system comprising a plurality of energy systems and a control platform, wherein the energy systems and the control platform are designed in such a way that in each case one item of information on at least one intended energy exchange can be communicated to the control platform by the energy systems for at least one time range, and, in respect of a target function, optimum energy exchanges between the energy systems can be calculated by means of the control platform as a solution of an optimization method, is characterized in that an item of information on a plurality of possible energy exchanges s can be communicated to the control platform at least by one of the energy systems, wherein a probability value $\zeta_s$ which can likewise be communicated to the control platform is assigned to each of these energy exchanges s; for each of the communicated possible energy exchanges s, an optimization method can be performed by the control platform, and therefore an associated partial solution $Z(\zeta_s)$ can be calculated; the total solution can be calculated from the plurality of partial solutions $Z(\zeta_s)$ by the control platform depending on their probability values $\zeta_s$; and the energy exchanges between the energy systems are controllable by the control platform on the basis of the determined total solution. The energy exchange system may configured to perform the mentioned features, such as, for example, the reception of the data and/or the calculation of the partial solutions and the total solution by means of the optimization method.

In some embodiments, the control of the energy exchanges s by means of the control platform takes place by a communication of respective control data to the respective energy system. By virtue of the communication of the control data, respective power engineering installations within the energy systems can be controlled, in particular started up, connected and/or disconnected. The control of a plurality of installations of an energy system is provided. In this case, the term control and that of control data should be interpreted broadly. Each data set which has, once it has been received by the respective energy system, in principle a direct or indirect partial effect on the operation of the respective energy system, in particular its power engineering installations, is included in the term control data. For this purpose, the energy systems may be configured to receive the control data from the control platform and to process them. In some embodiments, the energy systems comprise, for this purpose, a respective energy management system. The control data can preferably comprise, in particular encode, a price signal.

In some embodiments, for an intended energy consumption of one of the energy systems, an item of information on a maximum amount of energy to be consumed is received by the control platform from the energy system. In other words, the at least one energy system, in particular all of the energy systems participating in the energy exchange, communicates an item of information on the maximum amount of energy to be consumed by the energy system to the control platform. In this case, the communicated amount of energy is intended for a consumption. In other words, the energy systems which in particular do not communicate any possible energy exchanges and wish to consume a specific amount of energy within the time range communicate at least one maximum amount of energy to be consumed. If this maximum amount of energy to be consumed is combined with an item of information on a maximum fee, a buy order for the maximum amount of energy to be consumed is communicated to the control platform. In other words, a basic buy order is fixed by the item of information $(c_{t,n,k}^{B,max}, P_{t,n,k}^{B})$ or $(c_{t,n,k}^{B,max}, P_{t,n,k}^{B}\Delta T_t)$, where $c_{t,n,k}^{B,max}$ denotes the maximum fee at time t, at node n, of the energy system k. The energy system(s) which communicate(s) possible energy exchanges to the control platform communicate(s) the item of information $(c_{t,n,k}^{B,max}, P_{t,n,k}^{B,\zeta_s} \leq P_{t,n,k}^{B,\zeta_s,max})$ for all s=1, ..., $N_{t,n,k}$.

In some embodiments, for an intended provision of energy of one of the energy systems, an item of information on a maximum amount of energy to be provided is received by the control platform from the energy system. In other words, the at least one energy system, in particular all of the energy systems participating in the energy exchange, communicates an item of information on the maximum amount of energy to be provided by the energy system to the control platform. In this case, the communicated amount of energy is intended for a provision. In other words, the energy systems which in particular do not communicate any possible energy exchanges and wish to provide a specific amount of energy within the time range communicate at least one maximum amount of energy which can be provided. If this maximum amount of energy to be provided is combined with an item of information on a minimum fee, a sell order for the maximum amount of energy to be provided is communicated to the control platform. In other words, a basic sell order is fixed by the values/item of information $(c_{t,n,k}^{S,min}, P_{t,n,k}^{S})$ or $(c_{t,n,k}^{S,min}, P_{t,n,k}^{S}\Delta T_t)$, where $c_{t,n,k}^{S,min}$ denotes the minimum fee at time t, at node n, of the energy system k. The energy system(s) which communicate(s) possible energy exchanges s to the control platform communicate(s) the item of information $(c_{t,n,k}^{S,min}, P_{t,n,k}^{S,\zeta_s} \leq P_{t,n,k}^{S,\zeta_s,max})$ for all s=1, ..., $N_{t,n,k}$.

In some embodiments, the control platform therefore has received the items of information $(c_{t,n,k}^{B,max}, P_{t,n,k}^{B})$, $(c_{t,n,k}^{B,max}, P_{t,n,k}^{B,\zeta_s} \leq P_{t,n,k}^{B,\zeta_s,max})$ and $(c_{t,n,k}^{S,min}, P_{t,n,k}^{S})$, $(c_{t,n,k}^{S,min}, P_{t,n,k}^{S,\zeta_s} \leq P_{t,n,k}^{S,\zeta_s,max})$, where the index B denotes an energy consumption and the index S denotes an energy provision. Further items of information, in particular energy system-specific technical items of information/parameters, can be received by the control platform from the energy systems.

In some embodiments, the total solution is calculated from the plurality of partial solutions $Z(\zeta_s)$ by the maximum in respect of the probability values $\zeta_s$ of adjacent gradients of the partial solutions $Z(\zeta_s)$ of the possible energy exchanges s. In other words, the total solution $Z^*=Z(\zeta_{s=s^*})$ or its associated index s* is preferably determined or calculated by means of $$\max_s \left[ \frac{Z(\zeta_{s-1}) - Z(\zeta_s)}{\zeta_{s-1} - \zeta_s} - \frac{Z(\zeta_s) - Z(\zeta_{s+1})}{\zeta_s - \zeta_{s+1}} \right].$$

In this case, the probability values are in ascending order, i.e., $\zeta_1 \leq \zeta_2, \ldots, \zeta_{N-1}, \zeta_N$. For $\zeta_s$, therefore, $\zeta_{s-1}$ and $\zeta_{s+1}$ are adjacent. The boundary points $\zeta_1$ and $\zeta_N$ have only one adjacent probability value or are taken out of the mentioned determination.

In some embodiments, an individual target function $z(\zeta_s)$ which belongs to a possible energy exchange s is fixed by $$z(\zeta_s) = \sum_{t,n,k} \left[ P_{t,n,k}^{B,\zeta_s} \cdot c_{t,n,k}^{B,max} - P_{t,n,k}^{S,\zeta_s} \cdot c_{t,n,k}^{S,min} \right] \cdot \Delta T_t.$$

Thus, s target functions z are provided, or if $\zeta \in \mathbb{R}$ is continuous, a function $z(\zeta)$ is provided. For each value $\zeta_s$ and therefore for each possible energy exchange s, the present target function $z(\zeta_s)$ is maximized, i.e., the values of the variables $P_{t,n,k}^{B,\zeta_s}$ and $P_{t,n,k}^{S,\zeta_s}$ are determined in such a way that $z(\zeta_s)$ has a maximum target function value $Z(\zeta_s)$. In other words, each partial solution $Z(\zeta_s)$ is determined by its associated target function value $Z(\zeta_s)=\max[z(\zeta_s)]$, wherein the maximum is formed over all $P_{t,n,k}^{B,\zeta_s}, P_{t,n,k}^{S,\zeta_s}$. Typically secondary conditions are taken into consideration in the calculation of the partial solutions or the target function values. In this case, the maximization of the respective target function preferably takes place under the secondary conditions $P_{t,n,k}^{B,\zeta_s} \leq P_{t,n,k}^{B,\zeta_s,max}$ and $P_{t,n,k}^{S,\zeta_s} \leq P_{t,n,k}^{S,\zeta_s,max}$, where $P_{t,n,k}^{B,\zeta_s,max}$ and $\leq P_{t,n,k}^{S,\zeta_s,max}$, as mentioned above, are communicated to the control platform by the respective energy system and received by said control platform.

Furthermore, preferably $T=\Delta T_t$.

A possible energy exchange s can likewise be referred to as a scenario, with the result that the above optimization problem is solved for all of the scenarios. Then, a total solution is determined from the calculated partial solutions. In this case, the total solution is an advantageous compromise/balance between the amount of energy (trade volume) exchanged between the energy systems and the risk or the probability of the scenario (scenario probability $\zeta_s$). The total solution is in this case preferably determined for each target function value or each partial solution $Z(\zeta_s)$ of an associated scenario s or possible energy exchange s by $$\max_s \left[ k\frac{Z(\zeta_{s-1}) - Z(\zeta_s)}{\zeta_{s-1} - \zeta_s} - k\frac{Z(\zeta_s) - Z(\zeta_{s+1})}{\zeta_s - \zeta_{s+1}} \right],$$

where additionally an additional weighting factor k can be provided. In other words, an optimum scenario s*, which corresponds to the total solution $Z^*=Z(\zeta_{s=s^*})$, is determined. In the equation already mentioned above for the calculation of the total solution, k=1.

By means of the weighting factor k, the target function value or the scenario probability, i.e., the probability value of a possible energy exchange, can be weighted more strongly. For example, as a result a total solution which is as robust as possible can be determined using a smaller target function value. This may be advantageous in particular when the energy exchange system or the local energy market is intended to be operated with as low a risk as possible, i.e., with as low a level of uncertainty as possible in respect of the energy exchanges.

In some embodiments, the total solution is calculated by virtue of the fact that the difference in terms of absolute value between adjacent partial solutions $|Z(\zeta_s)-Z(\zeta_{s-1})|/(\zeta_{s-1}-\zeta_s)|$ exceeds a fixed threshold value. A possible method for calculating the total solution, i.e., in this case for determining a value s=s*, could be performed in accordance with the following steps. In a first step, the partial solutions are sampled, for example in accordance with their function characteristic $Z(\zeta_s)$. Typically, there is in this case a transition region, within which further $Z(\zeta_s)$ become markedly worse than a previous value. In this case, in a second step, the previous value should be fixed as s=s* or $Z(\zeta_{s*})$ as the total solution. In this case, $|Z(\zeta_s)-Z(\zeta_{s-1})/(\zeta_{s-1}-\zeta_s)|$, in comparison with adjacent values, exceeds the fixed threshold value.

For example, the gradient $|Z(\zeta_s)-Z(\zeta_{s-1})/(\zeta_{s-1}-\zeta_s)|$ has the values [1,5,1,10,1,1,1,1]. When the threshold value is 4, from low to high probability values, the partial solution associated with the value 5 would be determined as total solution. This is the case, for example, because an amount of exchanged energy (trade volume) which is as high as possible is advantageous. Typically, the threshold value has the dimension trade volume per probability value/scenario probability. The trade volume can have the unit kilowatt hours or euros. The probability values are dimensionless and have a numerical value of between 0 and 1 or of between 0 percent and 100 percent. As a result, the threshold value or the abovementioned gradient can be interpreted well. Depending on a present risk estimation, for example by means of later experience values, present conditions with respect to the superordinate grid etc., and a willingness to take risks, the threshold value can be fixed manually. Furthermore, the threshold value can change in dependence on time, i.e., a new threshold value can be fixed dynamically. In particular, this is dependent on a consistency of previous predicted and/or used probability values.

In some embodiments, the optimization problem could be formed by means of two target functions. In this case, a first target function could model the total amount of energy exchanged, and the second target function could model the scenario probability, i.e., the respective probability values. In this case, it is intended that both target functions be maximized. In order to solve the optimization problem, i.e., in order to calculate the partial solutions, known numerical solvers, in particular Gurobi™, can be used.

In some embodiments, reserve capacities required for the energy exchanges are determined by the control platform on the basis of the total solution. In other words, owing to the total solution, which takes into consideration the uncertainties with respect to the energy exchanges in and/or one of its configurations, an improved estimation of the required reserve energy or the required reserve capacities can take place. As a result, the energy efficiency of a local energy market which comprises the control platform can be improved. In particular, differences in the energy balance which lead to corresponding reserve capacities are identified prior to the actual energy exchanges and can therefore be reduced to be as low as possible in technically controllable fashion. In other words, grid bottlenecks can be reduced in anticipatory fashion by the inclusion of the uncertainties in the optimization model, in particular in combination with the grid topology.

Similar, equivalent or functionally identical elements can be provided with the same reference symbols in one of the figures or in the figures.

FIG. 1 shows an exemplary probabilistic prediction for a photovoltaic installation incorporating teachings of the present disclosure, in accordance with which possible energy exchanges and associated probability values can be determined and/or can be provided. Once they have been determined and/or provided, these probability values can be communicated to a control platform in accordance with the present invention and/or one of its configurations by the associated energy system, which in this case comprises the photovoltaic installation.

The hours in a day, for example the next day (day-ahead trade), are plotted on the x axis 200. The power provided by the photovoltaic installation in watts is plotted on the y axis 201. For each hour of the day, a probabilistic prediction is calculated. In other words, for each hour of the day, a plurality of probability values and associated possible energy exchanges are communicated to and received by the control platform. In this case, the probability values can be continuous, with the result that, for each hour of the day, a probability density function of the possible energy exchanges is communicated to and received by the control platform. The time range can be less than one hour, in particular 15 minutes, in particular for intra-day trade.

The figure shows quantiles of the probability distribution of from 10 percent to 90 percent in 10 percentage increments by means of different hatching for the respective hour. The actual characteristic of the power provided by the photovoltaic installation over the day is denoted by the reference symbol 202. It can be seen here that, precisely in the ranges of sunrise and sunset, marked deviations from the expected characteristic or with respect to the probability distribution occur.

In some embodiments, a partial solution of an optimization method is determined for each probability value $\zeta_s$, in this case for $\zeta_s$=10%, 20%, ..., 90%, which partial solution, for the associated probability value, represents an optimum and as efficient as possible, holistic solution with respect to the energy exchanges between the energy systems. This results in a function of the partial solutions which is dependent on the probability values. Then, an optimum total solution is calculated or determined from this function. This is shown illustratively in FIG. 2.

Figure 2:
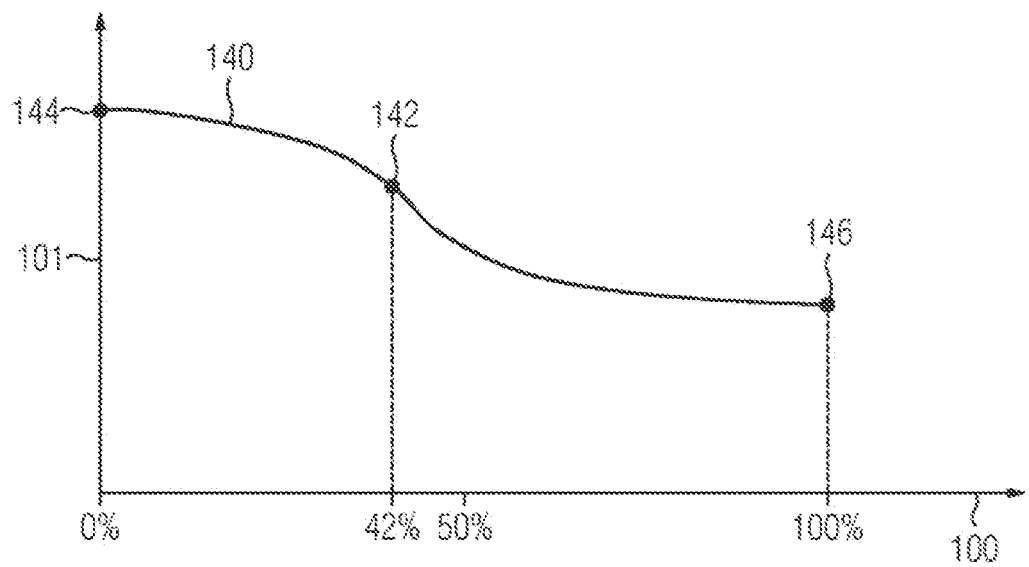
FIG. 2 shows a graphical representation of a calculation of a total solution.

FIG. 2 shows a graphical representation of a calculation or of a determination of a total solution 142 from the partial solutions, which together form a function 140 depending on the probability or depending on the probability values. The probability of a possible energy exchange, i.e., the respective probability value, is plotted as a percentage on the x axis 100. The value of the respective partial solution associated with the probability value is plotted in any desired dimension and unit on the y axis 101.

The totality of the partial solutions forms a function depending on the probability, the characteristic of which function is denoted by the reference symbol 140. The probability or the probability value for a possible energy exchange can likewise be referred to as a scenario probability since possible energy exchanges represent a respective scenario. Thus, the scenario probability is plotted as a percentage on the x axis 100.

The principal characteristic of the curve 140 shows that a high-risk total solution 144 can be determined which has an advantageous comparatively high target function value (value of the associated partial solution) but has a comparatively high risk. This is the case because the probability is substantially at 0% for the onset of the energy exchanges. Alternatively, a robust or low-risk total solution 146 can be determined which has a high probability, of in this case virtually 100%, but a disadvantageous and comparatively low target function value. In this case, it will be mentioned that, in respect of the optimization, a maximum possible target function value is advantageous since this characterizes, for example, the exchanged volume of energy. The target function can be supplemented by a weighted combination of total carbon dioxide emissions, primary energy use and/or the operating costs, which are typically intended to be minimized. However, a minimization can always be converted into a maximization by changing the mathematical sign of the target function. Therefore, in principle and without any restriction to generality, a target function value which is as large as possible is advantageous.

In accordance with FIG. 2, therefore, it is advantageous to determine a compromise between the high-risk solution 144 and the low-risk solution 146. This can take place in accordance with the present invention and/or one of its configurations, for example, by means of a marked change in the function characteristic 140. In this case, the compromise solution 142, i.e., the optimum total solution 142, has an associated probability value of 42%. A marked rise can be characterized by a marked change in adjacent gradients of the function 140.

The total solution 142 determined or calculated in accordance with the present invention is therefore a best possible compromise or balance between the high-risk total solution 144 and the low-risk total solution 146. As a result, particularly preferably the local energy exchange system (local energy market) according to the invention can be operated more efficiently in terms of energy and with a low risk of failure or operating risk.

Figure 3:
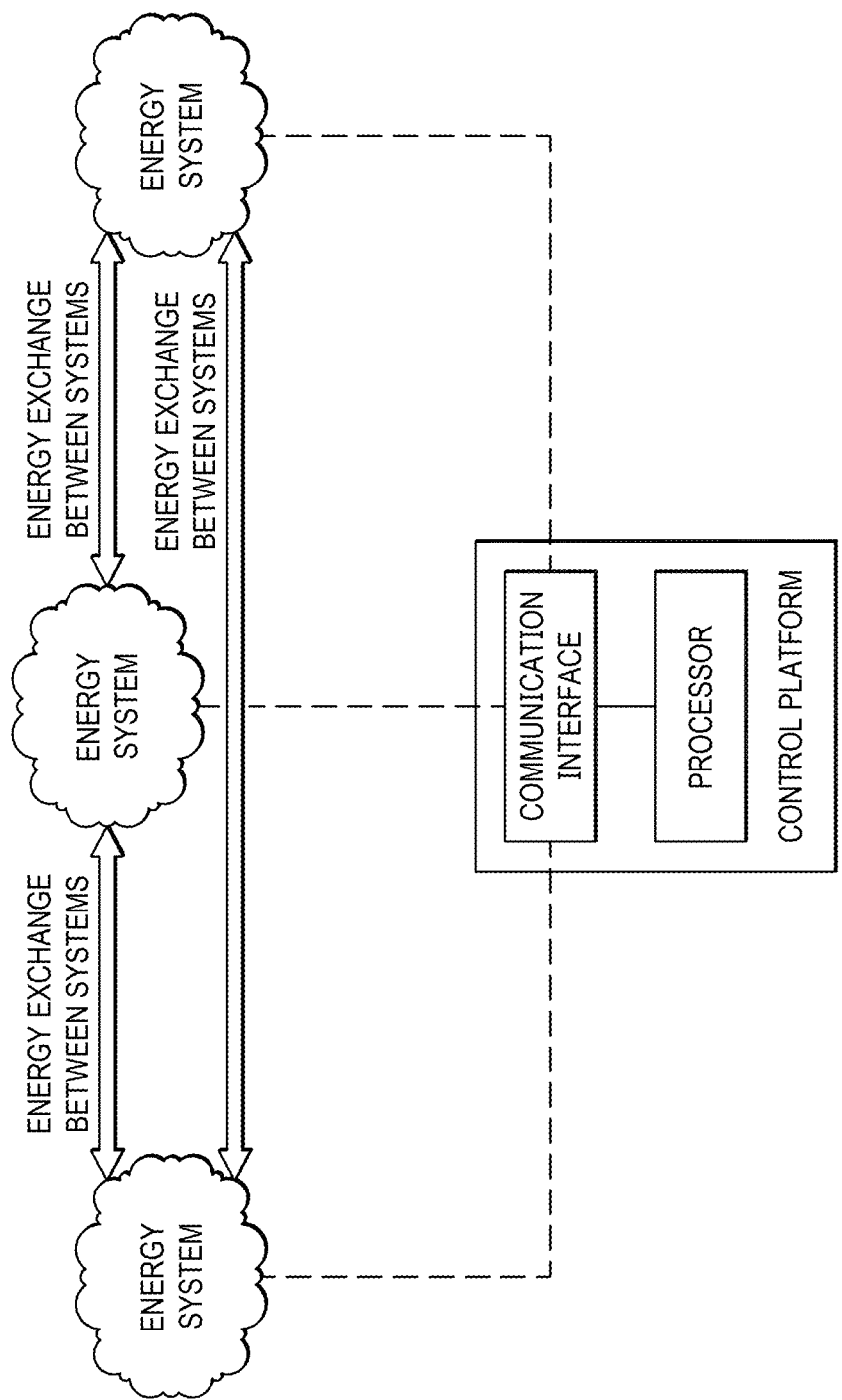
FIG. 3 is a schematic illustration of a control platform incorporating teachings of the present disclosure.

FIG. 3 is a schematic illustration of a control platform incorporating teachings of the present disclosure. The control platform includes a communication interface and a processor. The communication interface receives information from and sends information to a variety of energy systems. The processor uses the communication interface to gather data and then to distribute one or more of the solutions described herein. Further, the energy systems are able to exchange power between themselves at the direction of the control platform based on a determined total solution provided by the control platform.

Although the teachings herein have been illustrated and described in more detail by the exemplary embodiments, the scope of the disclosure is not restricted by the examples or other variations can be derived therefrom by a person skilled in the art without departing from the scope of protection of the disclosure.

LIST OF REFERENCE SYMBOLS

100 x axis
101 y axis
140 function
142 total solution
144 high-risk solution
146 low-risk solution
200 x axis
201 y axis
202 measurement curve

What is claimed is:

1. A method for operating a control platform for energy exchanges between a plurality of energy systems, the method comprising:
receiving information related to an intended energy exchange at the control platform from the plurality of energy systems for a first time range;
calculating, using a target function, optimum energy exchanges between the energy systems as a solution of an optimization method using the control platform;
receiving information at the control platform on a plurality of possible energy exchanges s from at least one of the plurality of energy systems, wherein a probability value $\zeta\_s$ received by the control platform is assigned to each of the plurality of energy exchanges s;
for each of the plurality of possible energy exchanges s, performing an optimization method, and therefore calculating an associated partial solution $Z(\zeta\_s)$ using a processor of the control platform;
calculating the total solution from the plurality of partial solutions $Z(\zeta\_s)$ depending on their probability values $\zeta\_s$ using the processor; and
controlling energy exchanges between the plurality of energy systems on the basis of the determined total solution using the control platform;
wherein calculating the total solution using a maximum in respect of the probability values $\zeta\_s$ of adjacent gradients of the partial solutions $Z(\zeta\_s)$ of the possible energy exchanges s.

2. The method as claimed in claim 1, wherein controlling the energy exchanges by the control platform includes communication of respective control data to the respective energy systems.

3. The method as claimed in claim 1, further comprising, for an intended energy consumption of one of the energy systems, receiving a maximum amount of energy to be consumed by the control platform from the energy system.

4. The method as claimed in claim 1, further comprising receiving a maximum amount of energy to be provided from one of the plurality of energy systems.

5. The method as claimed in claim 1, wherein the total solution is calculated by:

$$\max_s \left[ \frac{Z(\zeta_{s-1}) - Z(\zeta_s)}{\zeta_{s-1} - \zeta_s} - \frac{Z(\zeta_s) - Z(\zeta_{s+1})}{\zeta_s - \zeta_{s+1}} \right].$$

6. The method as claimed in claim 1, wherein calculating the total solution includes determining when a difference in terms of absolute value between adjacent partial solutions $|Z(\zeta\_s)-Z(\zeta\_(s-1))/(\zeta\_(s-1)-\zeta\_s)|$ exceeds a fixed threshold value.

7. The method as claimed in claim 1, further comprising determining reserve capacities required for the energy exchanges on the basis of the total solution.

8. A control platform for controlling energy exchanges between a plurality of energy systems, the control platform comprising:
a communication interface receiving information indicating an intended energy exchange from the plurality of energy systems for a first time range;
a processor using a target function to calculate an optimum energy exchanges between the respective energy systems by engaging an optimization method;
wherein the communication interface receives an item of information on a plurality of possible energy exchanges s from at least one of the energy systems;
wherein the communication interface receives a probability value $\zeta\_s$ and the processor assigns a probability value to each of the plurality of energy exchanges s;
wherein the processor performs an optimization method for each of the plurality of possible energy exchanges s and calculates an associated partial solution $Z(\zeta\_s)$;
wherein the processor calculates a total solution using the partial solutions $Z(\zeta\_s)$ depending on the respective probability values $\zeta\_s$; and
the control platform controls energy exchanges between the energy systems on the basis of the determined total solution;
wherein calculating the total solution using a maximum in respect of the probability values $\zeta\_s$ of adjacent gradients of the partial solutions $Z(\zeta\_s)$ of the possible energy exchanges s.

9. A method for operating an energy exchange system comprising a plurality of energy systems and a control platform, the method comprising:
- transmitting information on at least one intended energy exchange to the control platform from each energy system for a first time range;
- calculating at the control platform optimum energy exchanges between the energy systems as a solution of an optimization method for a target function;
- wherein at least one of the energy systems communicates information on a plurality of possible energy exchanges s to the control platform;
- assigning a probability value $\zeta\_s$ communicated to the control platform is assigned to each of these energy exchanges s;
- performing an optimization method for each of the communicated possible energy exchanges s and determining an associated partial solution $Z(\zeta\_s)$;
- calculating a total solution from the plurality of partial solutions $Z(\zeta\_s)$ depending on their probability values $\zeta\_s$; and
- controlling energy exchanges between the energy systems by the control platform on the basis of the determined total solution;
- wherein calculating the total solution using a maximum in respect of the probability values $\zeta\_s$ of adjacent gradients of the partial solutions $Z(\zeta\_s)$ of the possible energy exchanges s.

10. An energy exchange system comprising:
- a plurality of energy systems; and
- a control platform;
- wherein information on at least one intended energy exchange is communicated to the control platform by the energy systems for a first time range;
- in respect of a target function, optimum energy exchanges between the energy systems are calculated by the control platform as a solution of an optimization method;
- at least one of the energy systems communicates information on a plurality of possible energy exchanges s to the control platform;
- a probability value $\zeta\_s$ communicated to the control platform is assigned to each of these energy exchanges s;
- for each of the communicated possible energy exchanges s, an optimization method is performed by the control platform, and an associated partial solution $Z(\zeta\_s)$ is calculated;
- the total solution is calculated from the plurality of partial solutions $Z(\zeta\_s)$ by the control platform depending on their probability values $\zeta\_s$; and
- the energy exchanges between the energy systems are controlled by the control platform on the basis of the determined total solution;
- wherein calculating the total solution using a maximum in respect of the probability values $\zeta\_s$ of adjacent gradients of the partial solutions $Z(\zeta\_s)$ of the possible energy exchanges s.

* * * * *